United States Patent [19]
Orejola

[11] Patent Number: 5,503,186
[45] Date of Patent: Apr. 2, 1996

[54] ONE-WAY VALVE PANEL

[76] Inventor: Wilmo C. Orejola, 144 Mountain Ave., Pomptom Plains, N.J. 07444

[21] Appl. No.: 300,657

[22] Filed: Sep. 6, 1994

[51] Int. Cl.⁶ .................................................. F16K 15/14
[52] U.S. Cl. ................................................ 137/849; 137/844
[58] Field of Search ......................... 137/844, 846–850; 251/212; 623/2

[56] References Cited

U.S. PATENT DOCUMENTS 2,822,819  2/1958  Geeraert ................................ 137/844
2,922,437  1/1960  Rippingille .......................... 137/844
4,222,126  9/1980  Boretos ............................ 137/849 X Primary Examiner—Robert G. Nilson
Attorney, Agent, or Firm—Linval B. Castle

[57] ABSTRACT

A one-way fluid valve formed of a parallel plurality of one-way valve cells, each cell comprising three flexible leaflets each bonded to ⅓ of the edge of a hexagonal opening in a frame, their free center edges joining to close upon pressure from one side and separating to open the valve upon pressure from the opposite side of the frame.

4 Claims, 2 Drawing Sheets

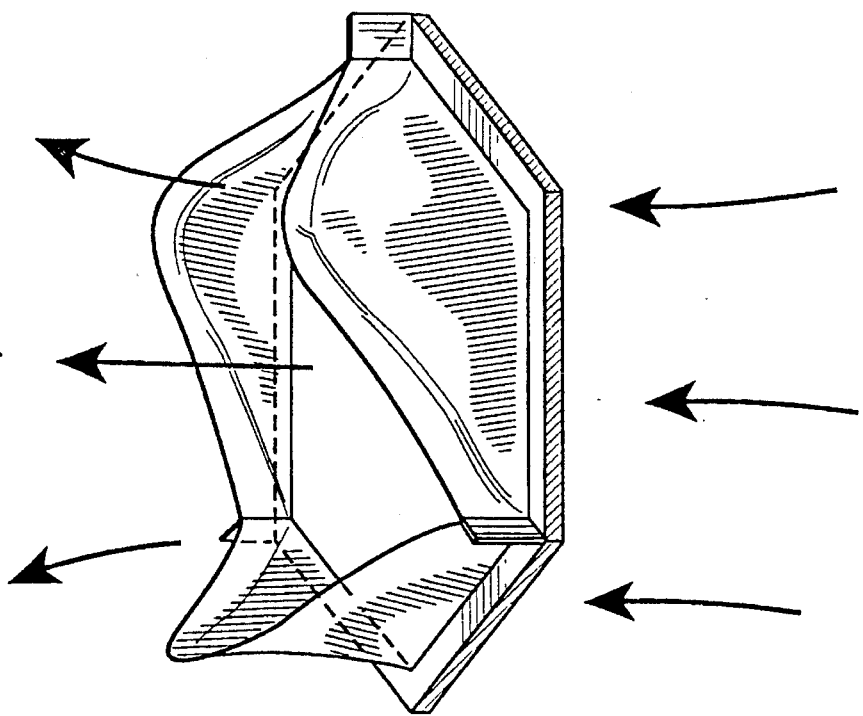
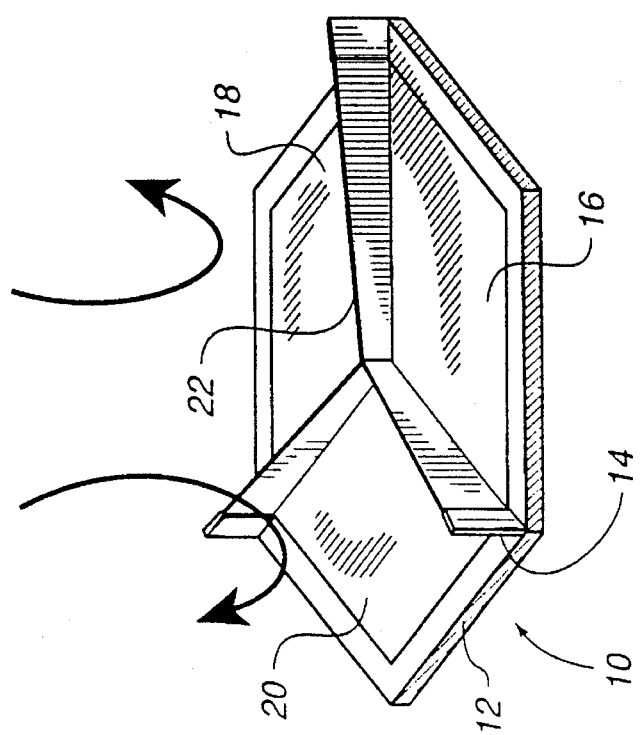

ONE-WAY VALVE PANEL

BRIEF SUMMARY OF THE INVENTION

This invention relates to valves and particularly to a one-way fluid valve formed of one or more valve cells in a panel, each cell having three flexible leaflets around the periphery of a hexagonal opening in such a way that the leaflets will close the hexagonal opening with a small fluid force from one side and open the opening with a small force from the opposite side.

A panel formed of a plurality of such cells arranged in a framework of chicken-wire-like mesh of contiguous hexagonal openings, with each cell comprised of three triangular non-porous cloth or plastic leaflets form a mechanism which allows fluid or air to pass freely through the cells in one direction only. Such a panel may take the form of a paddle for use in water or may even be designed into a wing for use in the air. Theoretically, a skydiver using a valved wing attached to his arms may be able to maintain himself aloft for sometime to maneuver himself around, and possibly some of the early designs for flying machines as envisioned by inventors such as Leonardo da Vinci could be made practical.

One use for a panel of one-way valves is as a simple canoe paddle or oar. Such an oar would not have to removed from the water since merely moving a one-way valve panel in the form of a oar back and forth will very quietly and effectively propel the craft. In paddling a canoe forward, all one-way valves are closed so that the panel acts as a regular solid paddle. In reaching forward for the next stroke, however, the valves on the panel are open to offer a minimum of resistance so that it is unnecessary to remove the paddle from the water.

DESCRIPTION OF THE DRAWINGS

In the drawings which illustrate a preferred embodiment of the invention:

FIG. 1 is a detailed view of a single one-way valve cell;

FIG. 2 is a detailed view of a single open one-way valve cell; and

DETAILED DESCRIPTION

Figure 3:
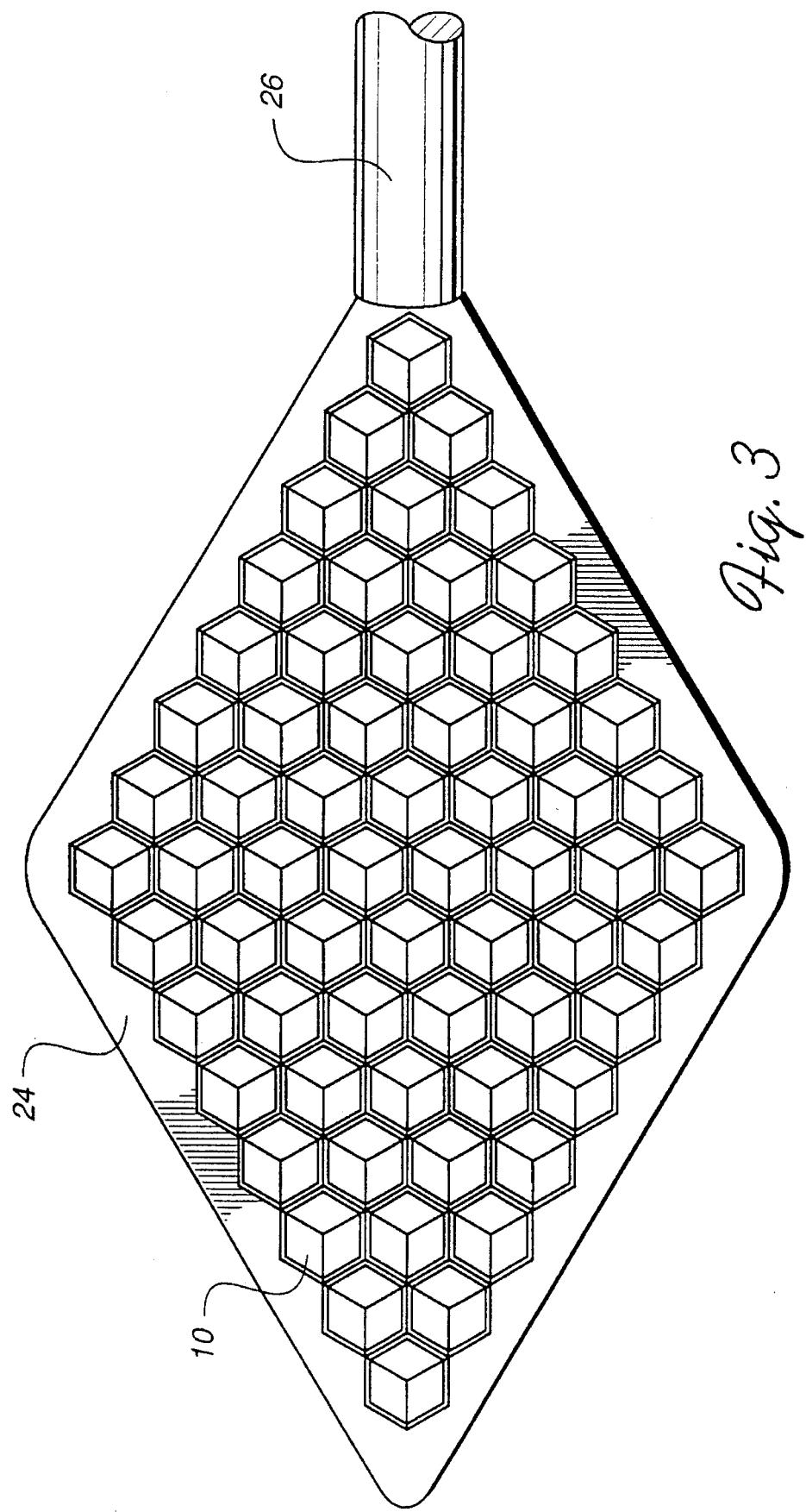
FIG. 3 illustrates a panel of one-way valve cells assembled to form a paddle or oar.

The one-way fluid valve of the invention comprises a honeycomb-like panel of parallel contiguous hexagonal cells, each cell being a small one-way valve that opens by a small pressure from a first side and returns to its normally closed state by the absence of pressure or a small pressure on a second side.

FIG. 1 illustrates one cell 10 in a closed state. Cell 10 is formed within a hollow hexagonal frame 12 having three vertically extending struts 14 located at alternate corners of the hexagon. Bonded to two adjacent edges of the hollow hexagonal frame 12 and to two of the struts 14 is a triangular shaped very pliable and flexible leaflet 16 of non-porous cloth or plastic.

Similar triangular shaped leaflets 18, 20 are bonded to the remaining pairs of adjacent edges of the hollow hexagonal frame 12 and to the three struts 14, each leaflet bonded to the edge of the hexagonal frame and to the strut along two sides and being folded upward at the free or redundant edge to contact the redundant edges of the remaining leaflets 22 to tightly close the cell against forces indicated by the curved arrows of FIG. 1.

It should be noted that the leaflets shown in FIG. 1 are slightly domed with the center of the redundant edges of the three leaflets 16, 18, 20 being higher than the hexagonal frame 12. This "doming" improves the efficiency of the cell by tightening the contact of the redundant edges of the three leaflets to provide a better seal, by strengthening the cell against back-pressure, and by permitting the cell to be opened wider.

FIG. 2 illustrates the cell of FIG. 1 when opened by a slight pressure from below, in the direction of the arrows. Here the importance of the pliability and flexibility of each leaflet becomes evident. Each leaflet is bonded to the the hollow hexagonal frame and to two struts, as shown, and the free or redundant edge of each will open to permit a flow of air or fluid through the hollow frame.

The cell of FIGS. 1 and 2 should be approximately two inches in diameter for two reasons. At alternate junctions of the sides of the hexagonal frame are perpendicular struts that support the free edges of the leaflets. A two inch diameter cell requires a perpendicular strut approximately ¼ inch in length; larger diameters require longer struts which may become awkward to handle. A second reason is that small diameter cells require small leaflets which, when bonded to the frame and struts, hold better structurally and have functionally smaller surface area thus less drag that larger leaflets.

FIG. 3 is a plan view illustrating a small boat or racing shell oar made of a plurality of cells 10 closely arranged in a frame member 24 and provided with a suitable loom and handle 26. In use, such an oar never would have to be removed from the water; merely working it backward and forward in the water would open and close the cells to propel the boat without any danger of "catching a crab" that occasionally removes an oarsman from the boat if he leaves his oar in the water too long.

I claim:

1. A one-way fluid valve comprising:

a hollow hexagonal shaped frame;

three perpendicular struts secured to the first side of said frame, each of said struts connected at the junction of alternate sides of said hexagonal frame; and three triangular shaped leaflets, each of said leaflets secured to two of said struts and to the edge of the hexagonal frame between said struts, each of said leaflets having a free edge, the free edges of said three leaflets joining to close the valve when fluid pressure is applied to said first side and separating to open the valve when pressure is applied to the opposite side.

2. The one-way valve claimed in claim 1 wherein said three leaflets are formed a flexible and very pliable non-porous material.

3. The one-way valve claimed in claim 1 wherein said three leaflets are "domed" up toward said first side when said valve is in a closed state.

4. The one-way valve claimed in claim 2 wherein the diameter of said valve is approximately two inches.

* * * * *